Figure 1:
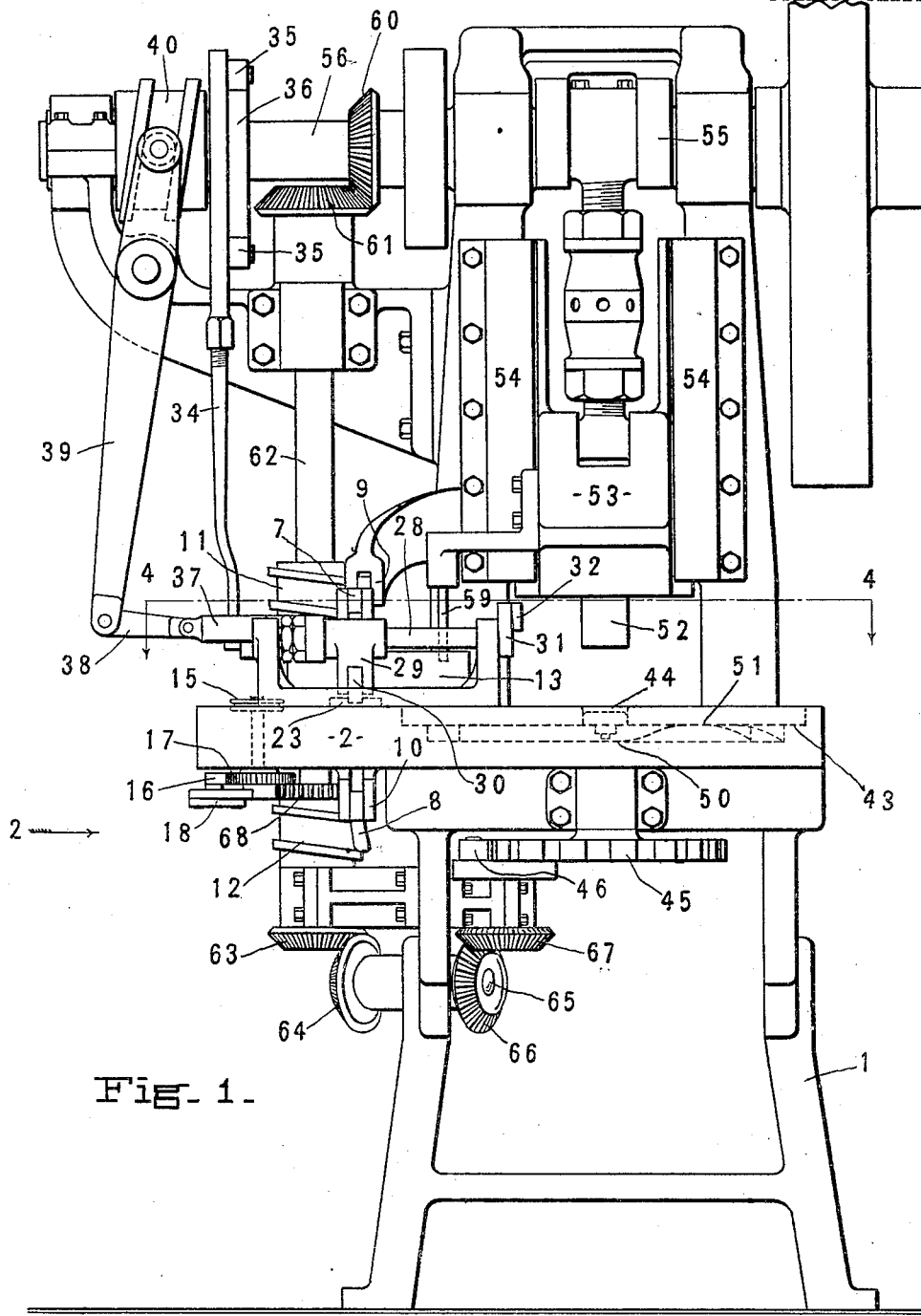

J. J. RIGBY.
MACHINE FOR PRODUCING RING BLANKS AND APPLYING THEM TO ARTICLES.
APPLICATION FILED MAY 4, 1908.

962,786. Patented June 28, 1910.
4 SHEETS—SHEET 1.

WITNESSES:

INVENTOR
John J. Rigby.
BY
Brock Deeken Smith
ATTORNEYS

J. J. RIGBY.
MACHINE FOR PRODUCING RING BLANKS AND APPLYING THEM TO ARTICLES.
APPLICATION FILED MAY 4, 1908.
962,786.
Patented June 28, 1910.
4 SHEETS—SHEET 2.
Fig. 2.
Fig. 3.
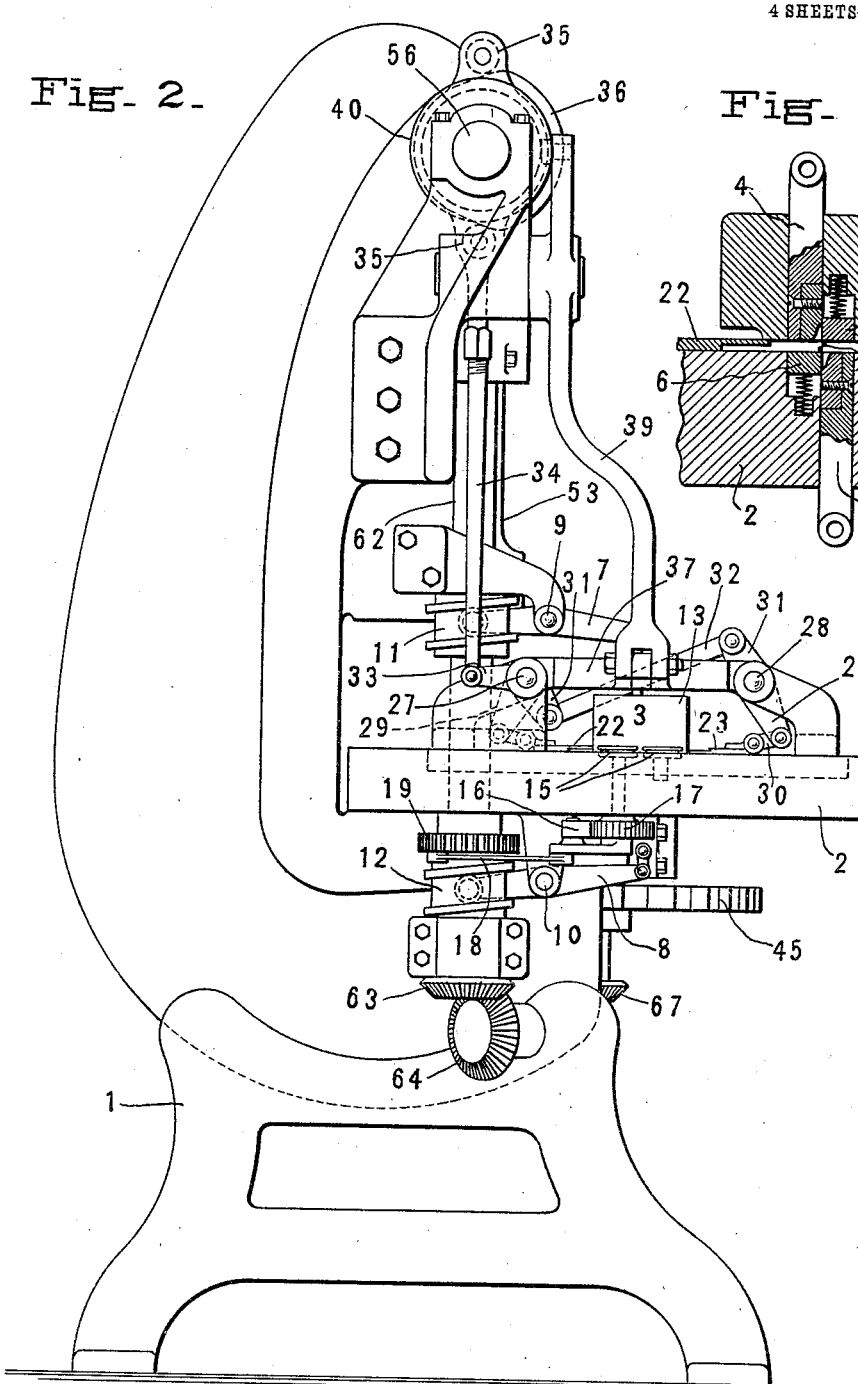
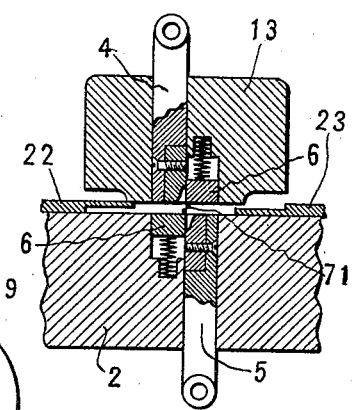
WITNESSES:
INVENTOR
John J. Rigby.
BY
Brock Beeken Smith
ATTORNEYS J. J. RIGBY.
MACHINE FOR PRODUCING RING BLANKS AND APPLYING THEM TO ARTICLES.
APPLICATION FILED MAY 4, 1908.

962,786.

Patented June 28, 1910.
4 SHEETS—SHEET 3.

WITNESSES:
J Clyde Ripley.
Emma Froop

INVENTOR
John J. Rigby.
BY
Brock Beeken Smith
ATTORNEYS

J. J. RIGBY.
MACHINE FOR PRODUCING RING BLANKS AND APPLYING THEM TO ARTICLES.
APPLICATION FILED MAY 4, 1908.
962,786.
Patented June 28, 1910.
4 SHEETS—SHEET 4.
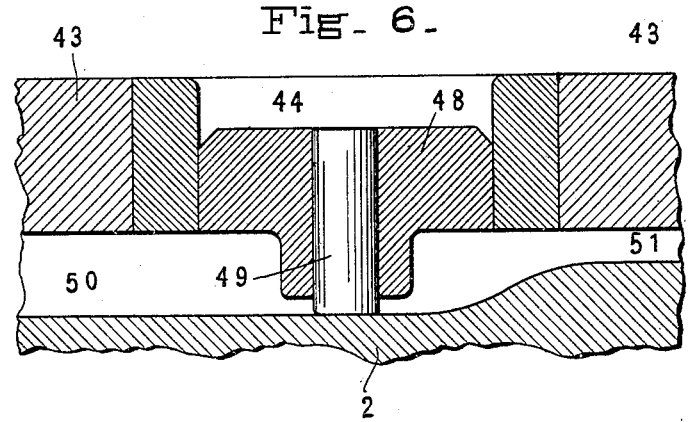
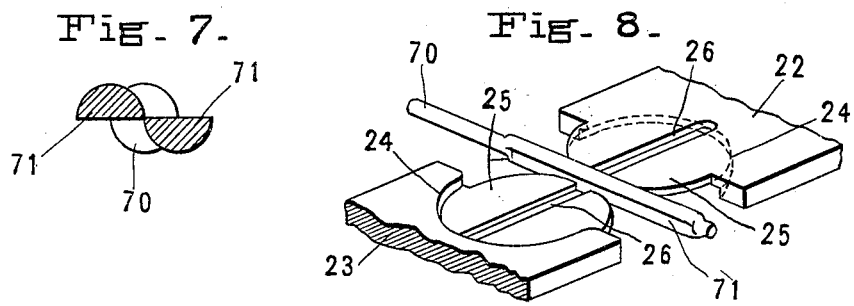
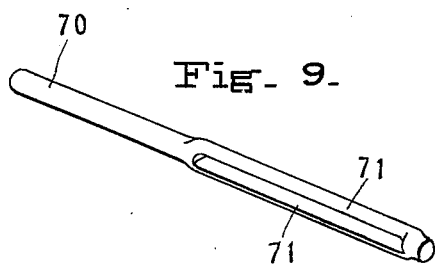
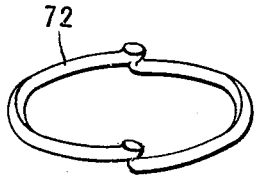
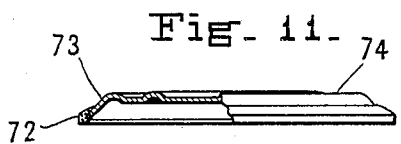
WITNESSES:
INVENTOR
John J. Rigby.
BY
Brock Becker & Smith
ATTORNEYS

UNITED STATES PATENT OFFICE.

JOHN J. RIGBY, OF BROOKLYN, NEW YORK.

MACHINE FOR PRODUCING RING-BLANKS AND APPLYING THEM TO ARTICLES.

962,786.  Specification of Letters Patent.  Patented June 28, 1910.

Application filed May 4, 1908. Serial No. 430,732.

*To all whom it may concern:*

Be it known that I, JOHN J. RIGBY, citizen of the United States, and resident of Brooklyn, in the county of Kings and State of New York, have invented a certain new and useful Machine for Producing Ring-Blanks and Applying Them to Articles, of which the following is a specification.

The present invention relates generally to the method of, and means for, producing a seamless ring member and applying it to the edge of an article, such, for instance, as a solder ring which is used on the edge of a can cap.

In the art as now practiced the solder is generally introduced into a die in which it is curled or bent and properly shaped, after which the cap to be edged is introduced at the top of the solder ring. The can cap thus produced has a non-continuous or broken solder ring which is apt to become displaced during shipment.

Sometimes the solder ring is produced from a comparatively wide ribbon of solder by stamping out a continuous or seamless ring which is then properly shaped and applied to a cap by placing the latter on top of the rim and subjecting the parts to the action of suitable dies. This method involves the waste of a great deal of solder and it is on that account objectionable. Moreover, in both cases the solder ring is applied partially on the inside of the cap, which is very objectionable from a hygienic point of view.

The object of this invention is to produce a seamless ring blank in an efficient and economical manner, avoiding waste of material and applying the ring blank so produced to the edge of an article, such as a can cap, without causing the solder to extend on the inside of the dependent flange of the can cap.

To this end the invention comprises the method of forming a seamless ring member which consists in splitting the wire or strand of material substantially throughout its length, leaving the ends unsplit, and then spreading and shaping the split portions into a continuous ring. The splitting of the wire will cause the split portions thereof to stand in different planes so that they may be readily spread and shaped. The ring thus produced is applied to the article by placing it on top of the said article and subjecting the parts to the action of suitable dies which will cause the solder ring to be securely attached to the exterior of the dependent flange of the cap and of the under edge thereof without, however, projecting up on the interior of the flange of the cap.

The invention further comprises suitable wire splitting mechanism consisting, in this instance, of two opposed cutting members located in different planes and, preferably, provided with a stripping member located adjacent to each cutting member and in the plane of the opposed cutting member.

The invention further consists in suitable spreading and shaping mechanism which, in this instance, is formed of two opposed members which engage with the split portions of the wire to spread and shape them. Preferably, this spreading and shaping mechanism is utilized as a conveyer to move the ring blank from the splitting mechanism to the blank receiving means, such as a die opening.

The invention further consists in suitable die and punch mechanism for applying the ring blank to an article, means for producing said ring blank independently of the die and punch mechanism and for conveying it into the top of the die, the said die having previously received the article on which the ring blank is to be applied.

Other features of construction, combination of parts and arrangements of elements will appear as the specification proceeds.

In the accompanying drawings the invention is embodied in a concrete and preferred form, but changes of construction and variation in form may be made without departing from the legitimate and intended scope of the invention.

Figure 4:
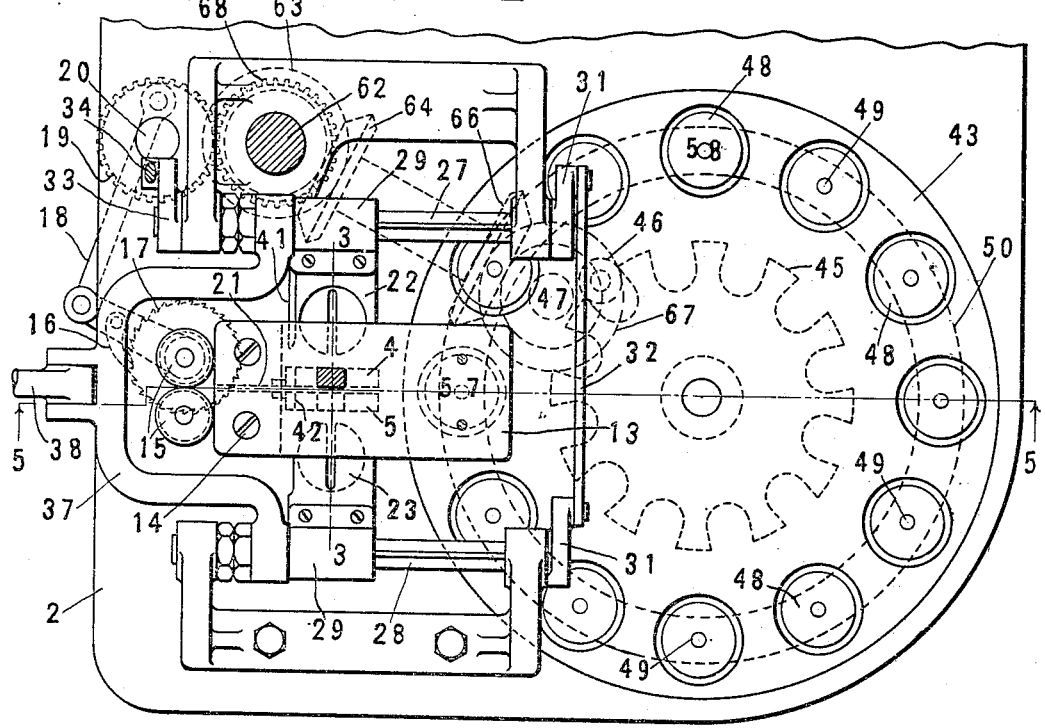
Figure 5:
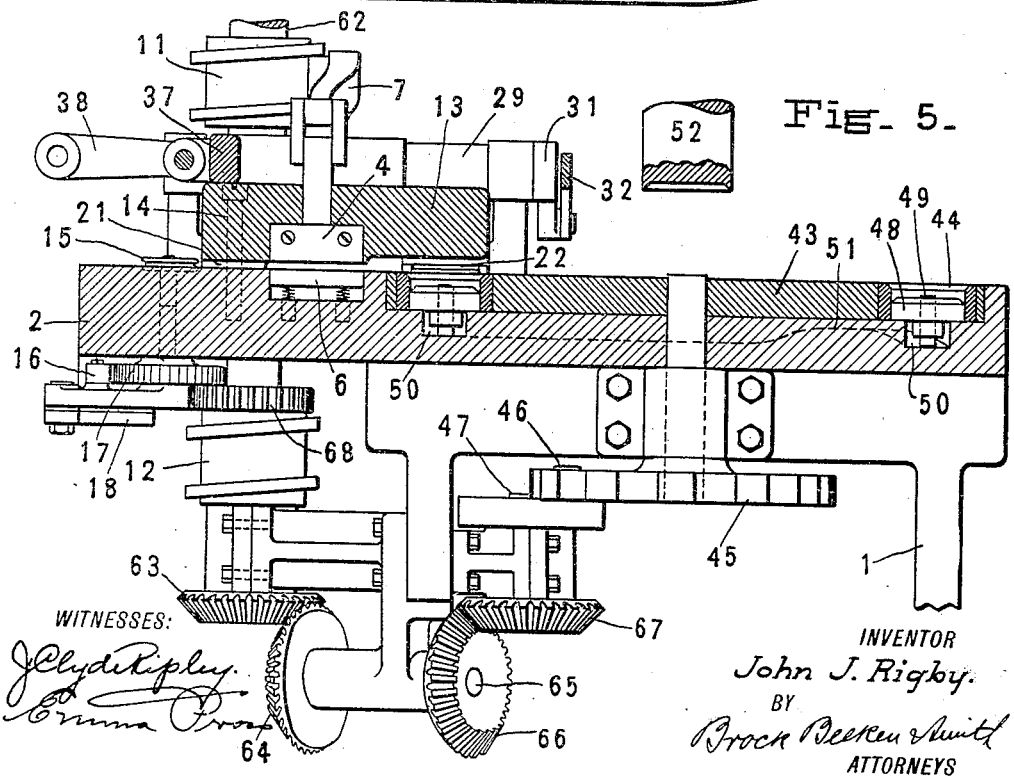

In the said drawings Figure 1 is a front elevation of a machine embodying the invention. Fig. 2 is a side elevation looking in the direction of the arrow 2 of Fig. 1. Fig. 3 is a sectional detailed view on the line 3—3 of Fig. 4. Fig. 4 is a plan view in section on the line 4—4 of Fig. 1. Fig. 5 is a vertical sectional view on the line 5—5 of Fig. 4 showing the spreading mechanism in position over the blank receiving means. Fig. 6 is a section through one of the dies, showing also the means for ejecting the blank. Figs. 7 to 11 inclusive illustrate more particularly the method of forming and applying the ring blank. Fig. 7 is a sectional view through a split wire showing the split portions offset, or out of alinement with respect to each other. Fig. 8 is a perspective view of the spreading and shaping mechanism about to act on a split strand of material. Fig. 9 is a perspective view of a strand of material, showing the wire as split into two connected portions. Fig. 10 is a view of the ring blank as it appears when it is acted upon by the spreading and shaping mechanism. Fig. 11 is a view of the cap with the ring of solder in position, partly in section.

Similar characters of reference indicate corresponding parts in the different views.

1 indicates a framework of any suitable construction for properly supporting the parts comprising the machine, having the feed table 2. Located on this feed table is a wire splitting mechanism 3 which is here composed of two cutting members 4 and 5 disposed oppositely to, but out of alinement with, each other. Adjacent to each cutting member is a stripping device in the plane of the opposed cutting member. In the present instance the stripping device takes the form of a spring seated plunger 6. The cutting members are given a vertical reciprocating motion by suitable means, such as the rocking levers 7 and 8 pivoted at 9 and 10 and operated by means of the cams 11 and 12. The lower cutting member 5 is guided in the bed plate as shown, while the upper cutting member 4 slides in a guide block 13 which is secured on the bed plate by means of the screws 14. The guide block 13 is so shaped as to permit the passage of a wire between the said guide block and bed plate so that it may be properly acted upon by the splitting mechanism, and also to allow a movement of a spreading and shaping mechanism, to be described, into engagement with the split portions of the wire. Suitable wire feed mechanism may be employed to feed the wire or strand of material from a continuous reel in the usual manner. The wire feed mechanism shown consists of two grooved rolls 15 between which the wire passes, and one of which rolls is given an intermittent progressive motion in one direction by means of the pawl 16 engaging with the ratchet 17 and actuated by the connection 18 secured to the gear 19 mounted on the stud 20. From the wire feed mechanism the wire passes in through the groove 21 in the guide block 13 into the plane of the cutting members of the splitting mechanism.

Located at right angles to the wire splitting mechanism and having a reciprocating motion in a horizontal plane toward and away from each other, are the two members 22 and 23 of the wire spreading and shaping mechanism. These two members are provided with concave shaping faces 24 which when brought together form a complete circle or other configuration which it may be desired to give the blank. These members further have oppositely disposed spreading and shaping projections 25 which are adapted to fit against the concave faces 24 so that when the two members are brought together they will form a circular die groove, as it were, and serve to properly shape the blank to be acted upon. It will be noted that the projections 25 are located in different planes and the concave faces 24 are likewise located in different planes. These members are provided with the grooves 26 which permit a stripping member to enter and hold the ring while the members separate, thereby allowing the blank to be removed from the spreading and shaping mechanism. The members 22 and 23 rest on the bed plate and are operated from the rock shafts 27 and 28 by means of the levers 29 and links 30. These two rocking shafts are connected together by means of the levers 31 and link 32. Motion is imparted to the rock shaft 27 by means of the lever 33 and rod 34 which is provided with a cam roll 35 engaging with the cam 36. The members 22 and 23 have imparted to them a sliding motion by the shafts 27 and 28 and are adapted to be reciprocated back and forth in unison between the splitting mechanism and suitable blank receiving means, by means of the bracket 37 which connects the two members together and to which motion is imparted by means of the links 38, lever 39 and cam 40. Mounted on one of the spreading members is the wire cutter 41 adapted to sever the reel into lengths of wire along the line 42. It will be noticed that this knife is so positioned as to be timed to act after the spreading and shaping mechanism has obtained a purchase on the split portions of the wire.

43 indicates a rotatable dial having a plurality of die openings 44. Any suitable means may be employed for giving an intermittent rotatable motion to this dial, such as the Geneva stop wheel 45 actuated by the eccentrically disposed pin 46 mounted on the stud 47. These dies are provided with a supporting pad 48 which is adapted to receive the can cap to which the solder ring is to be applied. This pad also acts to eject the finished product by having the projection 49 extending into the cam groove 50 having a high point 51 which causes the pad to be raised.

52 indicates a punch which is mounted on the slide 53 reciprocating in the guides 54 and actuated by the eccentric crank 55 on the main shaft 56. The parts are so arranged that the die openings are successively presented at the point shown in Fig. 4 indicated by 57 where they will receive the ring blank from the spreading and shaping mechanism, after which the blanks are subjected to the action of the punch at the point indicated by 58.

59 indicates one of two strippers which are movable with the punch and which are indicated in Fig. 4 at the point 57 where they descend through the slots 26 so as to hold the ring blank while the members 22 and 23 recede.

Any suitable gearing may be employed for operating the parts. In the present instance motion is transferred from the main shaft 56 by means of the bevel gears 60 and 61 to the upright cam shaft 62 which carries the cams 11 and 12. From thence motion is transmitted through the bevel gears 63 and 64 to the stub shaft 65 from which in turn the motion is imparted by means of bevel gears 66 and 67 to the stud 47. The shaft 62 is further provided with a gear 68 engaging with the gear 19 on the stud 20.

The operation is as follows:—A strand of wire indicated by 70 is fed by the wire feed rolls into the plane of the splitting mechanism. The members of the splitting mechanism are thereupon actuated and the wire is split into two offset connected portions 71. The members 22 and 23 of the spreading and shaping mechanism now move forward and after they have obtained a purchase on the split portions 71 the knife 41 will sever the wire from the reel. The members of the spreading and shaping mechanism continuing their motion spread and shape the split portions 71 into a seamless ring 72. In this instance, the blank is only partly shaped by this action, it being preferred to complete the shaping by the dies which apply it to the cap. It is apparent, however, that the ring blank can be given such final shape as may be desired, by these members. The spreading mechanism now moves as an entirety into the plane of one of the dies in the rotatable dial at the point indicated by 57. As the members 22 and 23 move away from each other, the stripper members 59 will hold the ring blank in the plane of the die opening, into which latter the said blank drops when the members 22 and 23 have receded far enough. The spreading mechanism now returns to the plane of the splitting mechanism, and the rotatable dial is progressed to position another die ready to receive another blank. Before the die receives the ring blanks, the cap is placed on the pad 48, so that when the ring blank drops into the die it will fall on top of the cap. When the die reaches the position indicated by 58, the punch 52 descends and forces the ring into intimate contact with the exterior and under edge of the flange 73 of the cap 74, without, however, projecting up on the inside of the said flange. The edged cap is finally ejected from the die when the high point 51 of the cam 50 is reached. The final shaping of the ring by the action of the punch removes all evidence of the manner in which the ring is produced. The word "ring" as used in this specification and accompanying claims is not employed in a narrow sense. The shape of the so-called "ring" need not be circular, since by properly shaping the parts any configuration desired can be obtained. Different materials may be handled in the machine so that rings of copper, steel, etc., may be produced, as well as those of solder.

So far as certain of the claims herein are concerned, it is immaterial how the seamless ring blank is produced. Thus applicant intends to cover the feature of placing the ring blank on top of the cap and then forcing it into contact therewith irrespective of the method of or means for producing the ring blank.

What is claimed is:—

1. The combination of a wire feed mechanism, a wire splitting mechanism receiving the wire from the feed mechanism, means adjacent the splitting mechanism for spreading the split portions of the wire, means for severing the wire while held by the spreading means into the proper length, and operating mechanism for actuating the elements set forth.

2. The combination of means for splitting a strand of material substantially throughout its length, leaving the ends of the strand unsplit, means receiving the strand from the splitting means for spreading the split portions of the strand and shaping them, means for applying the blank produced to the edge of an article, means for conveying the blank from the spreading means to the blank applying means and operating mechanism for actuating the elements set forth.

3. The combination of a wire feed mechanism, a wire splitting mechanism, means for spreading the split portions of the wire, means for severing the wire into lengths, means for applying the blank produced to the edge of an article, and operating mechanism for actuating the elements set forth.

4. The combination of a wire splitting mechanism, comprising oppositely disposed cutting members having a vertically reciprocating motion, a wire spreading and shaping mechanism comprising oppositely disposed members having a horizontally reciprocating motion, and operating mechanism for the members of the splitting and spreading mechanisms.

5. The combination of a wire splitting mechanism having a reciprocating motion, a wire spreading and shaping mechanism having a reciprocating motion, at right angles to the motion of the splitting mechanism, and operating means for effecting the reciprocating motion of the splitting and spreading mechanisms.

6. The combination of a wire feed mechanism, a wire splitting mechanism having a vertical reciprocating motion, a wire spreading and shaping mechanism having a horizontal reciprocating motion, means for severing the wire into lengths, and operating mechanism for actuating the elements set forth.

7. The combination of a wire feed mechanism, a wire splitting mechanism having a reciprocating motion, a wire spreading and shaping mechanism having a reciprocating motion, means for severing the wire into lengths carried by the wire spreading mechanism, and operating mechanism for actuating the elements set forth.

8. The combination of a wire splitting mechanism, a wire spreading and shaping mechanism located substantially at right angles to the wire splitting mechanism, and operating mechanism for actuating the splitting and spreading mechanisms.

9. The combination of a wire feed mechanism, a wire splitting mechanism, a wire spreading and shaping mechanism located substantially at right angles to the splitting mechanism, means for severing the wire into lengths, and operating mechanism for actuating the elements set forth.

10. The combination of a wire feed mechanism, a wire splitting mechanism, a wire spreading and shaping mechanism located substantially at right angles to the splitting mechanism, means for severing the wire into lengths carried by the spreading mechanism, and operating mechanism for actuating the elements set forth.

11. The combination of a wire splitting mechanism having a reciprocating motion, a wire spreading and shaping mechanism having a reciprocating motion located substantially at right angles to the splitting mechanism, and operating mechanism for actuating the splitting and spreading mechanisms.

12. The combination of a wire feed mechanism, a wire splitting mechanism having a reciprocating motion, a wire spreading and shaping mechanism having a reciprocating motion located substantially at right angles to the splitting mechanism, means for severing the wire into lengths, and operating mechanism for actuating the elements set forth.

13. The combination of a wire feed mechanism, a wire splitting mechanism having a reciprocating motion, a wire spreading and shaping mechanism having a reciprocating motion located substantially at right angles to the splitting mechanism, means for severing the wire into lengths carried by the spreading mechanism, and operating mechanism for actuating the elements set forth.

14. The combination of a vertically movable wire splitting mechanism, a horizontally movable spreading and shaping mechanism adjacent the wire splitting mechanism, and operating mechanism for actuating the splitting and spreading mechanisms.

15. The combination of a wire feed mechanism, adapted to feed a wire in a horizontal plane, a vertically movable wire splitting mechanism associated therewith, a horizontally movable spreading and shaping mechanism adapted to receive the wire from the splitting mechanism, means for severing the wire into lengths, and operating mechanism for actuating the elements set forth.

16. The combination of a wire feed mechanism adapted to feed a wire in a horizontal plane, a vertically movable wire splitting mechanism, a horizontally movable spreading and shaping mechanism, means for severing the wire into lengths carried by the spreading mechanism, and operating mechanism for actuating the elements set forth.

17. The combination of a vertically reciprocating wire splitting mechanism, a horizontally reciprocating spreading and shaping mechanism, and operating mechanism for actuating the splitting and spreading mechanisms.

18. The combination of a wire feed mechanism adapted to feed a wire in a horizontal plane, a vertically reciprocating wire splitting mechanism, a horizontally reciprocating spreading and shaping mechanism, means for severing the wire into lengths, and operating mechanism for actuating the elements set forth.

19. The combination of a wire feed mechanism adapted to feed a wire in a horizontal plane, a vertically reciprocating wire splitting mechanism, a horizontally reciprocating spreading and shaping mechanism, means for severing the wire into lengths carried by the spreading mechanism, and operating mechanism for actuating the elements set forth.

20. The combination of a wire splitting mechanism, blank receiving means, a wire spreading and shaping mechanism adapted to ply between the splitting mechanism and blank receiving means and adapted to take the split portions of the wire and spread and shape them into a ring blank which it delivers to the blank receiving means, and operating mechanism for actuating the splitting and spreading mechanisms.

21. The combination of a wire feed mechanism, a wire splitting mechanism, blank receiving means, means for severing the wire into lengths, a wire spreading and shaping mechanism adapted to ply between the splitting mechanism and blank receiving means and adapted to take the split portions of the wire and spread and shape them into a ring blank which it delivers to the blank receiving means, and operating mechanism for actuating the splitting and spreading mechanisms and the wire severing means.

22. The combination of a wire splitting mechanism, blank receiving means, a wire spreading and shaping mechanism having a to and fro movement between the splitting mechanism and the blank receiving means and comprising two oppositely disposed members adapted to move toward and away from each other, and operating mechanism for actuating the splitting and spreading mechanisms.

23. The combination of an intermittently rotatable dial having a plurality of die openings, a wire splitting device, a wire spreading and shaping mechanism adapted to transfer a blank from the splitting mechanism to one of the die openings on the rotatable dial, and operating mechanism for actuating the elements set forth.

24. A wire splitting mechanism comprising a pair of cutting members disposed oppositely to, but out of alinement with, each other, means for operating said cutting members, and stripper members located adjacent to each cutting member and in the plane of the opposed member.

25. The combination of a bed plate, a guide block supported on said bed plate and having a wire groove, a wire splitting mechanism consisting of two opposed cutting members slidably mounted in the bed plate and guide block, a wire feed mechanism, a spreading and shaping mechanism consisting of two members having a reciprocating motion toward and away from each other and adapted to extend in under the said guide block in the plane of the opposed members, means for severing the wire into lengths, and operating mechanism for actuating the elements set forth.

26. The combination with means for splitting a strand of material, of spreading means adapted to grasp said split portion of material, and cutting means adapted to sever the strand of material while held in the grip of the spreading means, so as to leave the split portion of the strand with two unsplit ends.

27. The combination with wire splitting mechanism, of wire spreading means comprising two coacting members adapted to reciprocate in between the splitting mechanism and to receive the split wire therefrom.

28. The combination with means for splitting a strand of material, means for feeding the material to the splitting means, die mechanism, and means for spreading the split strand of material adapted to take the split strand from the splitting means and subsequently to convey it to the die mechanism.

29. The combination with wire splitting mechanism, means for feeding the wire to the splitting mechanism, means for cutting off the split portions of the wire, die mechanism, and means for spreading the split wire adapted to take the wire from the splitting mechanism and subsequently to convey it to the die mechanism.

Signed at New York city, in the county of New York and State of New York, this 27th day of April, A. D. 1908.

JOHN J. RIGBY.

Witnesses:
   Axel V. Beeken,
   Geo. A. Marshall.